(12) United States Patent
Utsunomiya

(10) Patent No.: US 8,550,633 B2
(45) Date of Patent: Oct. 8, 2013

(54) LASER PROJECTOR HAVING A DIFFUSER VIBRATED BY USING COMPONENT OF A COOLING MECHANISM

(75) Inventor: Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 290 days.

(21) Appl. No.: 12/736,284

(22) PCT Filed: Mar. 28, 2008

(86) PCT No.: PCT/JP2008/056147
§ 371 (c)(1),
(2), (4) Date: Sep. 27, 2010

(87) PCT Pub. No.: WO2009/118902
PCT Pub. Date: Oct. 1, 2009

(65) Prior Publication Data
US 2011/0013149 A1    Jan. 20, 2011

(51) Int. Cl.
| | | |
|---|---|---|
| *G03B 21/14* | (2006.01) | |
| *G03B 21/16* | (2006.01) | |
| *G03B 21/18* | (2006.01) | |
| *G03B 21/26* | (2006.01) | |
| *G02B 5/02* | (2006.01) | |
| *G02B 13/20* | (2006.01) | |
| *G02F 1/1335* | (2006.01) | |
| *F21V 7/04* | (2006.01) | |
| *F21V 11/00* | (2006.01) | |
| *H01J 5/16* | (2006.01) | |
| *H01P 5/00* | (2006.01) | |

(52) U.S. Cl.
USPC .......... 353/52; 353/38; 353/57; 353/94; 359/599; 362/558; 349/64

(58) Field of Classification Search
USPC ....... 353/38, 46, 52, 54, 57–61, 94; 359/599, 359/707; 362/558; 349/64
See application file for complete search history.

(56) References Cited

U.S. PATENT DOCUMENTS

| | | | |
|---|---|---|---|
| 7,156,522 B2* | 1/2007 | Plut | 353/31 |
| 7,593,159 B2* | 9/2009 | Yokoyama et al. | 359/446 |
| 2003/0039036 A1 | 2/2003 | Kruschwitz et al. | |
| 2006/0157230 A1* | 7/2006 | Kawahara et al. | 165/104.33 |
| 2006/0227293 A1 | 10/2006 | Kasazumi et al. | |
| 2007/0070303 A1 | 3/2007 | Yonekubo | |
| 2008/0088804 A1* | 4/2008 | Peterson et al. | 353/69 |
| 2009/0213350 A1* | 8/2009 | Sogard | 355/67 |
| 2010/0118535 A1* | 5/2010 | Kusukame et al. | 362/259 |

FOREIGN PATENT DOCUMENTS

| | | |
|---|---|---|
| JP | 7-297111 A | 11/1995 |
| JP | 11-64789 A | 3/1999 |
| JP | 2003-98476 A | 4/2003 |
| JP | 2007-94154 A | 4/2007 |
| WO | WO 2005/008330 A1 | 1/2005 |
| WO | WO 2006/095855 A1 | 9/2006 |

* cited by examiner

Primary Examiner — Tony Ko
Assistant Examiner — Jori S Reilly-Diakun
(74) Attorney, Agent, or Firm — McGinn Intellectual Property Law Group, PLLC

(57) ABSTRACT

A projection-type image display apparatus that enlarges and displays an image includes: a case, a laser light source, a cooling mechanism that includes a component that produces vibration during operation, a diffuser that diffuses light that is emitted from the laser light source, optics that shape light diffused by the diffuser to light having a uniform luminance distribution and rectangular cross-section, and an optical modulation element that modulates light shaped by the optics; wherein the component included in the cooling mechanism and the diffuser are connected by way of a vibration transmitting member.

20 Claims, 10 Drawing Sheets

(a)

(b)

(a)

(b)

(a)

(b)

(a)

(b)

LASER PROJECTOR HAVING A DIFFUSER VIBRATED BY USING COMPONENT OF A COOLING MECHANISM

TECHNICAL FIELD

The present invention relates to a projection-type image display apparatus that uses a laser light source.

BACKGROUND ART

In recent years, laser light sources are receiving attention as one light source of a projection-type image display apparatus of which projectors are representative. A laser light source has several advantages. First, laser light emitted from a laser light source features superior directivity and therefore features high optical utility efficiency. In addition, laser light is monochromatic and therefore can broaden the color reproduction region. A laser light source also features low power consumption and long life.

FIG. 1 shows a schematic block diagram of a projector that uses a laser light source. Projector 1 shown in FIG. 1 includes at least: laser light sources 2a-2c corresponding to each of the primary color signals R/G/B; collimator lenses 3a-3c, light tunnels 4a-4c, optical modulation elements (liquid crystal panels) 5a-5c, dichroic prism 6, and projection lens 7.

Polarization beam splitters (PBS) 8a-8c are arranged between each of laser light sources 2a-2c and each of collimator lenses 3a-3c. In addition, incidence-side polarizing plates 9a-9c are arranged on the light incidence side of each of liquid crystal panels 5a-5c. Emission-side polarizing plates 10a-10c are arranged on the light emission sides of each of liquid crystal panels 5a-5c.

The operation of projector 1 shown in FIG. 1 is next summarized. Laser light beams 12a-12c emitted from each of laser light sources 2a-2c, respectively, are converted to specific linearly polarized light by polarization beam splitters (PBS) 8a-8c and pass through collimator lenses 3a-3c, respectively. Laser light beams 12a-12c that have passed through collimator lenses 3a-3c are directed into light tunnels 4a-4c. The beam diameters of laser light beams 12a-12c that have passed through collimator lenses 3a-3c are gradually enlarged until being irradiated into light tunnels 4a-4c.

Light tunnels 4a-4c are hollow prisms. A reflective film is applied by vapor deposition to the inner wall surfaces of light tunnels 4a-4c. Laser light beams 12a-12c irradiated into light tunnels 4a-4c from one opening of each of light tunnels 4a-4c, respectively, advance toward the other opening while being repeatedly reflected inside light tunnels 4a-4c. In the process of advancing inside light tunnels 4a-4c, not only is the luminance distribution in the luminous flux cross-sections of laser light beams 12a-12c equalized, but the sectional profiles are reshaped into a rectangular form.

Laser light beams 12a-12c that are emitted from each of light tunnels 4a-4c are irradiated into corresponding liquid crystal panels 5a-5c, respectively. Laser light beams 12a-12c that have been irradiated into liquid crystal panels 5a-5c undergo optical modulation according to image signals. The light that has undergone optical modulation is synthesized by dichroic prism 6 and enlarged and projected onto screen 11 by way of projection lens 7.

However, when coherent light such as laser light is irradiated onto a rough surface (such as a screen) having unevenness that is greater than the wavelength of the light, a mottled light pattern referred to as a "speckle pattern" or "speckle" is produced. More specifically, light of a single wavelength that is scattered at each point on a rough surface overlaps irregularly at each point on the observed surface to produce a complicated interference pattern.

Thus, when an image is projected onto a screen by a projector that uses a laser light source, the laser light is diffused on the screen surface and strong random noise (speckled noise) is produced. When this speckle is formed as an image on an observer's retina in this case, the speckle is perceived as unfocused mottled flickering, and this causes discomfort and fatigue for the observer. The observer further senses extreme degradation of the image quality.

In the field of projectors that employ laser light sources, various methods have been proposed for reducing the above-described speckle noise.

Typically, two approaches exist as methods for reducing speckle noise. One involves making the laser light incoherent (Approach 1), and other involves reducing the perceived speckle (Approach 2).

Approach 1 is a method of canceling the coherence of laser light to convert to incoherent light. The broadening of wavelength width by means of high-frequency superimposition, the multiplexing of laser light having a delay that is greater than the coherence length, or the overlapping of orthogonal polarized light all pertain to Approach 1. Essentially, Approach 1 is a method of altering the characteristics of light to control the generation of speckle.

In contrast, Approach 2 is a method for reducing apparent speckle by repeatedly superimposing the (integral) speckle pattern in an image at time intervals (<40 msec) that are indistinguishable to the human eye to equalize speckle noise. Methods of vibrating the screen or optics components belong to Approach 2. Methods that belong to Approach 2 do not alter the characteristics of light, and speckle is therefore generated. Approach 2 is a method that takes advantage of an illusion in the human brain to make speckle imperceptible to the eye.

Of the methods that pertain to Approach 2 (reducing perceptible speckle), the method of reducing speckle noise by vibrating optics components is taken up in the present specification.

FIG. 2 is a perspective view showing a first technique for reducing speckle noise. FIG. 2(a) shows an example of the first technique, and FIG. 2(b) shows another example. The details of the first technique are disclosed in JP-A-H11-064789. In the example shown in FIG. 2(a), optical integrator 17a composed of two fly-eye lenses 13c and 13d rotates around an optical axis. When the optics rotate, the speckle pattern moves temporally and spatially in the optics, the speckle that is image-formed on the retina is integrated, and the apparent speckle noise is reduced. In the example shown in FIG. 2(b), on the other hand, a similar effect is obtained by the rotation of rod-type optical integrator 19a (a transparent medium such as glass having a rectangular cross-section) around the optical axis.

FIG. 3 is a block diagram showing a second technique for reducing speckle noise. FIG. 3(a) shows an example of the second technique, and FIG. 3(b) shows another example. The details of the second technique are disclosed in JP-A-H07-297111. In the example shown in FIG. 3(a), diffusion plate 16b that is caused to rotate by motor 20 is arranged midway on an optical path. When diffuser 16b rotates, the scattering state on the optical path changes and the speckle pattern vibrates temporally and spatially, whereby the speckle that is formed as an image on the retina is integrated and the apparent speckle noise is reduced. In the example shown in FIG. 3(b), diffuser 16c that is arranged midway on an optical path is caused to vibrate by transducer 23. When diffusion plate 16c vibrates, the apparent speckle noise is reduced due to the same principles as previously described.

FIG. 4 is a sectional view showing a third technique for reducing speckle noise. FIG. 4(a) shows an example of the third technique, and FIG. 4(b) shows another example. The details of the third technique are disclosed in JP-A-2003-098476. In the example shown in FIG. 4(a), diffuser 16d is arranged between beam expanding optics 25 that include expanding lens (collimator lens 3f) and collimator lens 3g and beam shaping optics 27 that include two fly-eye lenses 13e and 13f and condenser lenses 14h and 14i. Diffuser 16d is caused to vibrate by movement-inducing means 26a. When diffuser 16d vibrates, the speckle pattern vibrates temporally and spatially, whereby the speckle that is formed as an image on the retina is integrated and the apparent speckle noise is reduced. In addition, in the example shown in FIG. 4(b), diffuser 16e is also arranged between beam shaping optics 27 and spatial optical modulation element 5f. Diffusers 16d and 16e are caused to vibrate by movement-inducing means 26a and 26b.

FIG. 5 is a structural diagram showing a fourth technique for reducing speckle noise. FIG. 5(a) shows one example of the fourth technique and FIG. 5(b) shows another example. The details of the fourth technique are disclosed in WO2005/008330. In the example shown in FIG. 5(a), diffuser 16f arranged midway in an optical path is connected to diffuser vibration section 28a. Diffuser vibration section 28a causes diffuser 16f to vibrate at a vibration speed V. Vibration speed V is set to satisfy the relation V>d×30 where d is the particle size of diffuser 16f. WO2005/008330 discloses control of the diffusion angle of a diffuser based on the relation between the numerical aperture of the illumination optics and the F-number of the projection lens to suppress the optical loss of laser light caused by a diffuser. In the example shown in FIG. 5(b), rod-type optical integrators 19b are used in place of two fly-eye lenses 13g and 13h.

DISCLOSURE OF THE INVENTION

Problem to be Solved by the Invention

A large-scale rotation mechanism is necessary for causing an optical integrator to rotate around its optical axis to integrate speckle, and this requirement leads to an increase in costs and cubic volume of packaging, and further, to an increase in power consumption. Luminous flux irradiated into an optical modulation element passes through an optical integrator that is revolving, and this motion introduces the potential for shifting of the optical axis of the luminous flux from a predetermined position.

To supplement the explanation regarding power consumption, the use of a laser that is employed in place of a lamp in a projector eliminates the need for separation optics and further reduces the size of the light source, thereby enabling miniaturization of the optics engine. In addition, power consumption of the laser light source is lower than a lamp light source, whereby the realization of a battery-driven portable projector can be anticipated. Realizing a portable projector necessitates the reduction of power consumption of the overall apparatus, and an increase in power consumption of the mechanism for reducing speckle noise is therefore to be avoided.

A large-scale rotation mechanism or vibration mechanism is necessary for causing a diffuser arranged midway in an optical path to rotate or vibrate, and such mechanisms therefore lead to an increase in costs or an increase in package volume. In addition, issues are also raised similar to those described above relating to the increase of power consumption. Problems also arise relating to optical loss.

The optical transmittance of a diffuser is typically lower than that of a lens (on the order of 80-90%). In addition, because the spacing of a hologram pattern becomes denser as the diffusion angle increases, the integration effect of speckle that is caused by vibration increases but the optical transmittance decreases. Accordingly, using a diffuser having a large diffusion angle to augment the speckle reduction effect results in an increase of optical loss and a reduction of brightness. In the example shown in FIG. 4(b) in particular, two diffusers are arranged on an optical path. Such a case results in added speckle reduction effect but also results in added optical loss, whereby the problem of decreased luminance becomes severe.

Regarding the operating conditions of diffusers (frequency and amplitude), the following conditions can be considered.

Flickering of an image within a short time interval (<40 msec) is integrated (averaged) in the human brain that processes the image and is therefore not perceived. Accordingly, if speckle images that have greater movement than the average size of a speckle pattern are superimposed a plurality of times in a short time interval (<40 msec), the speckle pattern is integrated and becomes imperceptible.

Accordingly, when a diffuser is caused to vibrate to reduce the apparent speckle, the vibration frequency of the diffuser must be set such that the movement speed of the speckle pattern that is formed as an image on the retina exceeds the limit of human perception. In addition, the vibration amplitude of the diffuser must be set such that the amount of displacement of the speckle pattern that is formed as an image on the retina exceeds the average size of the speckle pattern.

The diffuser vibration conditions that are required for reducing speckle noise are as shown below, where F is the vibration frequency of the diffuser, ±A is the vibration amplitude, ±a is the amount of displacement of the speckle pattern on the retina, T is the time limit of perceiving flicker of an image, n is the number of superimpositions of the speckle pattern (in the brain), and δ is the average size of the speckle pattern.

$$(2a/\delta) \times F > (1/T) \times n$$

$$\therefore F > (n \times \delta)/(2a \times T) \quad (1)$$

$$\text{where } a > \delta/2 \quad (2)$$

When the diffusion plane moves, however, the speckle pattern also moves in accompaniment, but the amount of displacement (A) of a rough surface (diffusion plane) and the amount of movement of speckle (a) are in a proportional relation that is strongly dependent on the optics. If this proportionality constant is set to k, the following equation applies:

$$a = k \times A \quad (3)$$

Accordingly, expression (1) and expression (2) can be rewritten as follows:

$$F > (n \times \delta)/(2k \times A \times T) \quad (1)'$$

$$A > \delta/2k \quad (2)'$$

Because the average size δ of a speckle pattern is proportional to the product of the light source wavelength and the F-number of the pupil, the average size δ of a speckle pattern can be found by the following equation, where λ is the wavelength of laser light, f is the focal length of an eyeball, and D is the diameter of the pupil:

$$\delta = 1.22 \lambda \times f/D \quad (4)$$

As can be understood from expressions (1)' and (2)', causing a diffuser to vibrate to average a speckle pattern requires that the vibration frequency (F) and vibration amplitude (A) of the diffuser be made greater than certain threshold values. To the extent that these threshold values are surpassed and vibration frequency (F) and vibration amplitude (A) increase, the number of superimpositions (n) of speckle increases and the effect of reducing speckle noise is raised (however, this effect becomes asymptotic at a certain level). Accordingly, when a diffuser that is arranged on an optical path is vibrated to average a speckle pattern, the diffuser must be vibrated at high frequency and great amplitude. However, causing a diffuser to vibrate at high frequency and great amplitude tends to bring about an increase in power consumption and noise.

It is an object of the present invention to reduce speckle noise without bringing about an increase in power consumption or noise.

The object, features, and advantages of the above-described present invention other than described hereinabove will become obvious by reference to the following description and accompanying drawings showing examples of the present invention.

BEST MODE FOR CARRYING OUT THE INVENTION

The present invention relates to a projection-type image display apparatus that uses a laser light source. The oscillation wavelength and output of the laser light source (semiconductor laser) are dependent on temperature. Normally, the oscillation wavelength shifts toward a longer wavelength at the rate of approximately 0.3 nm/° C. as the temperature of the semiconductor laser rises. On the other hand, the oscillation wavelength shifts toward a shorter wavelength at the rate of approximately 0.3 nm/° C. as the temperature drops. In addition, when the temperature of a semiconductor laser element becomes high, its output drops. Accordingly, the temperature must be adjusted during operation to stabilize the oscillation wavelength and output of the semiconductor laser. In other words, measures must be taken during operation such as cooling the semiconductor laser or lowering the ambient temperature of the semiconductor laser.

The present invention features the reduction of speckle noise by using a cooling mechanism that directly cools a laser light source or a cooling mechanism for lowering the ambient temperature of the laser light source.

Examples of exemplary embodiments of the projection-type image display apparatus of the present invention are next described while referring to the accompanying figures.

The optical modulation elements of the projection-type image display apparatus of the present exemplary embodiment are liquid crystal panels, and the optical integrators are light tunnels. However, the optical modulation elements are not limited to liquid crystal panels, and the optical integrators are not limited to light tunnels. For example, DMD (Digital Micro-mirror Devices) may be used for the optical modulation elements, and rod-type optical integrators or two fly-eye lenses may be used for the optical integrators. The basic configuration of the projection-type image display apparatus has already been described and redundant description is therefore here omitted.

In the following explanation, only one channel of the R/G/B channels is described in the interest of simplifying the explanation. The other two channels that are not described have substantially the same configuration.

Figure 1:
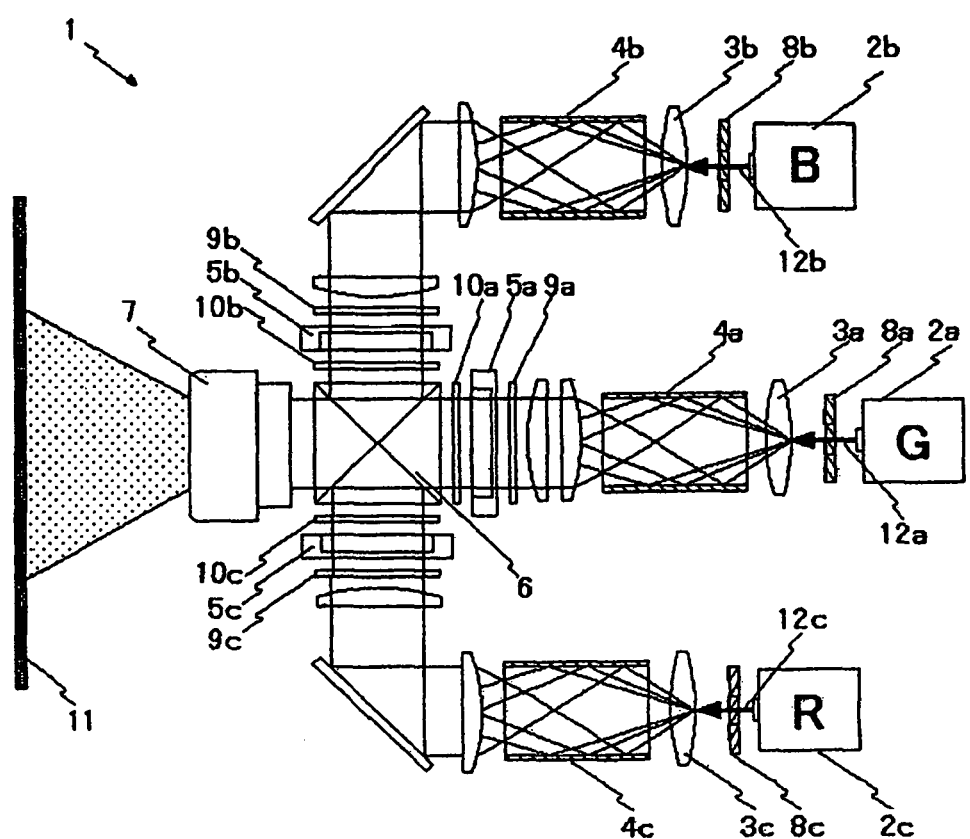
FIG. 1 is a schematic view showing a schematic representation of a projector that uses a laser light source.
Figure 2:
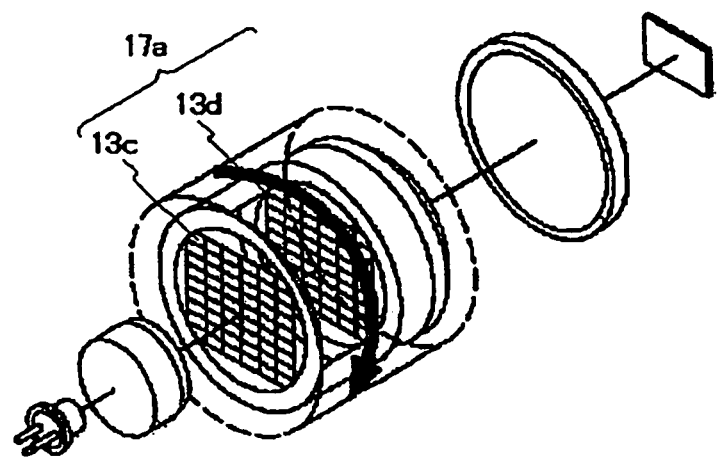
FIG. 2 is a schematic view showing a first technique relating to speckle reduction.
Figure 2:
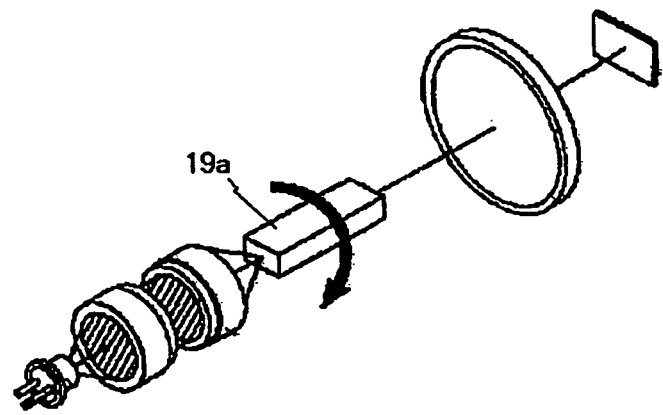
Figure 3:
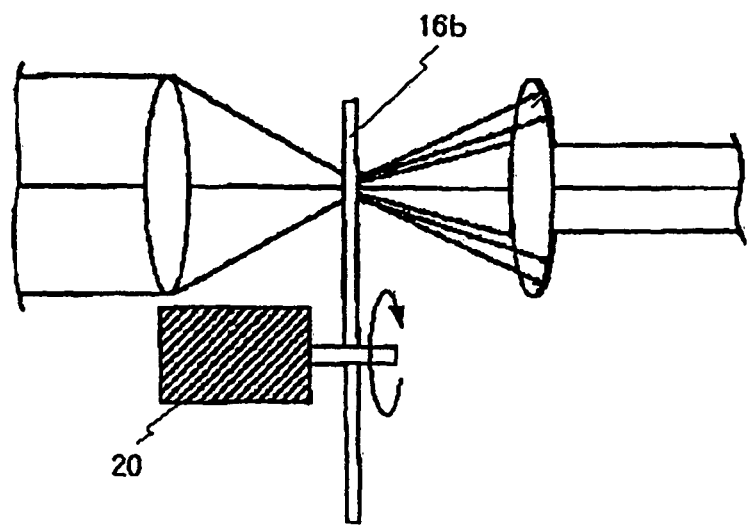
FIG. 3 is a schematic view showing a second technique relating to speckle reduction.
Figure 3:
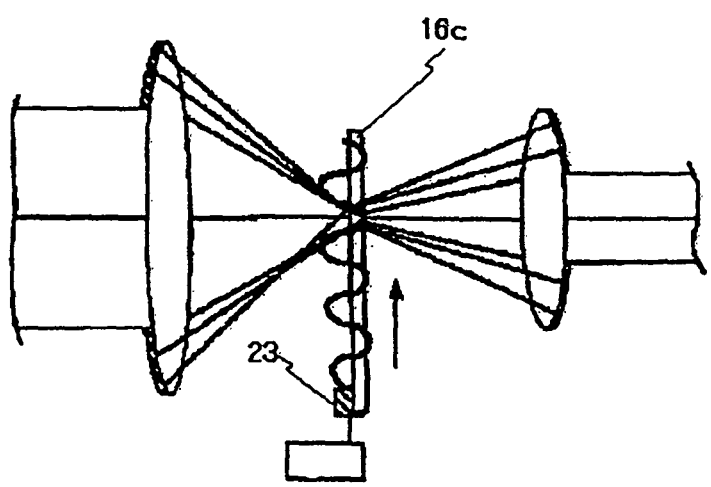
Figure 4:
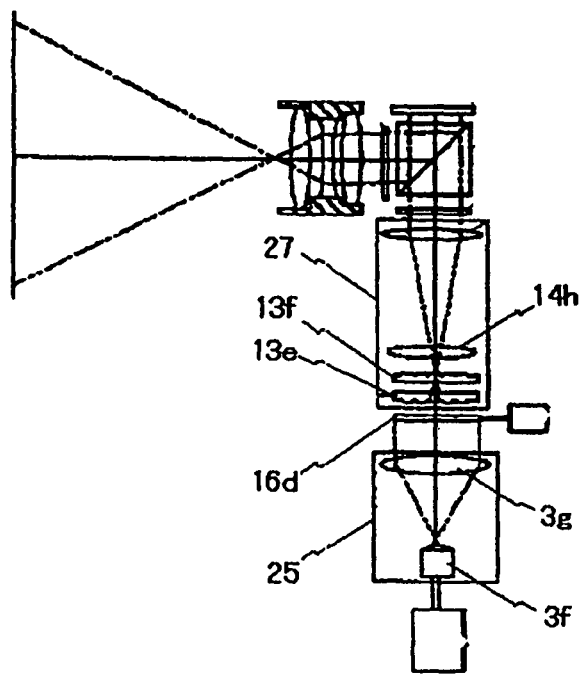
FIG. 4 is a schematic view showing a third technique relating to speckle reduction.
Figure 4:
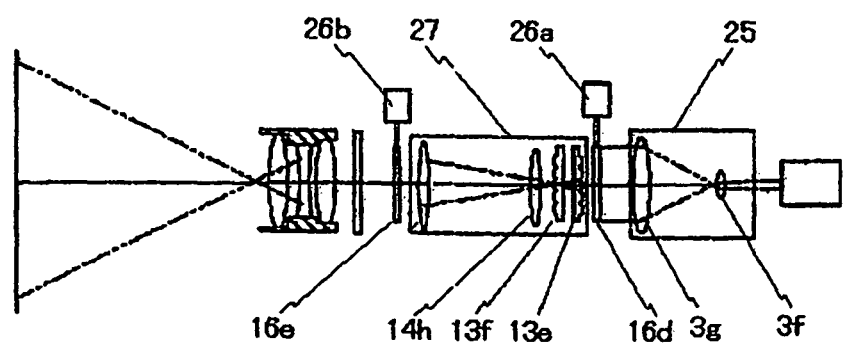
Figure 5:
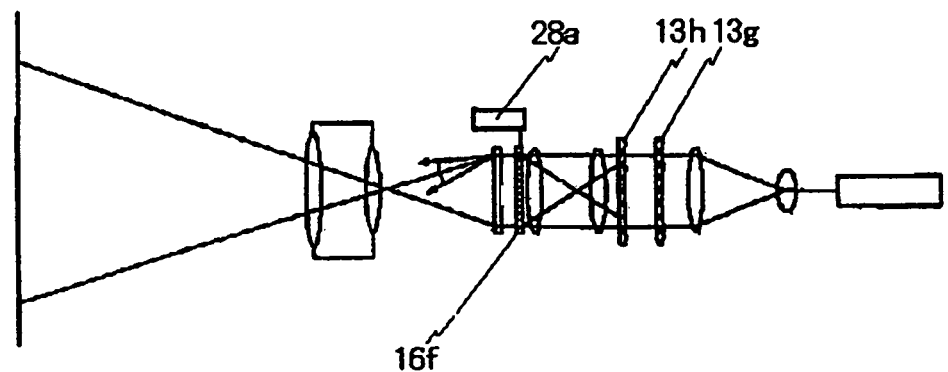
FIG. 5 is a schematic view showing a fourth technique relating to speckle reduction.
Figure 5:
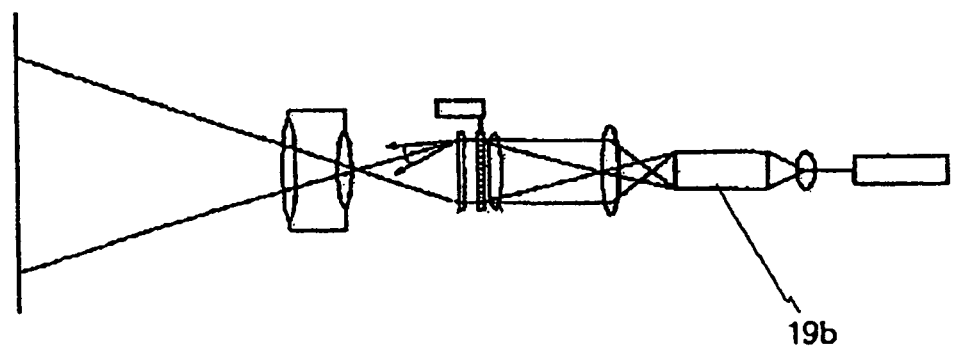
Figure 6:
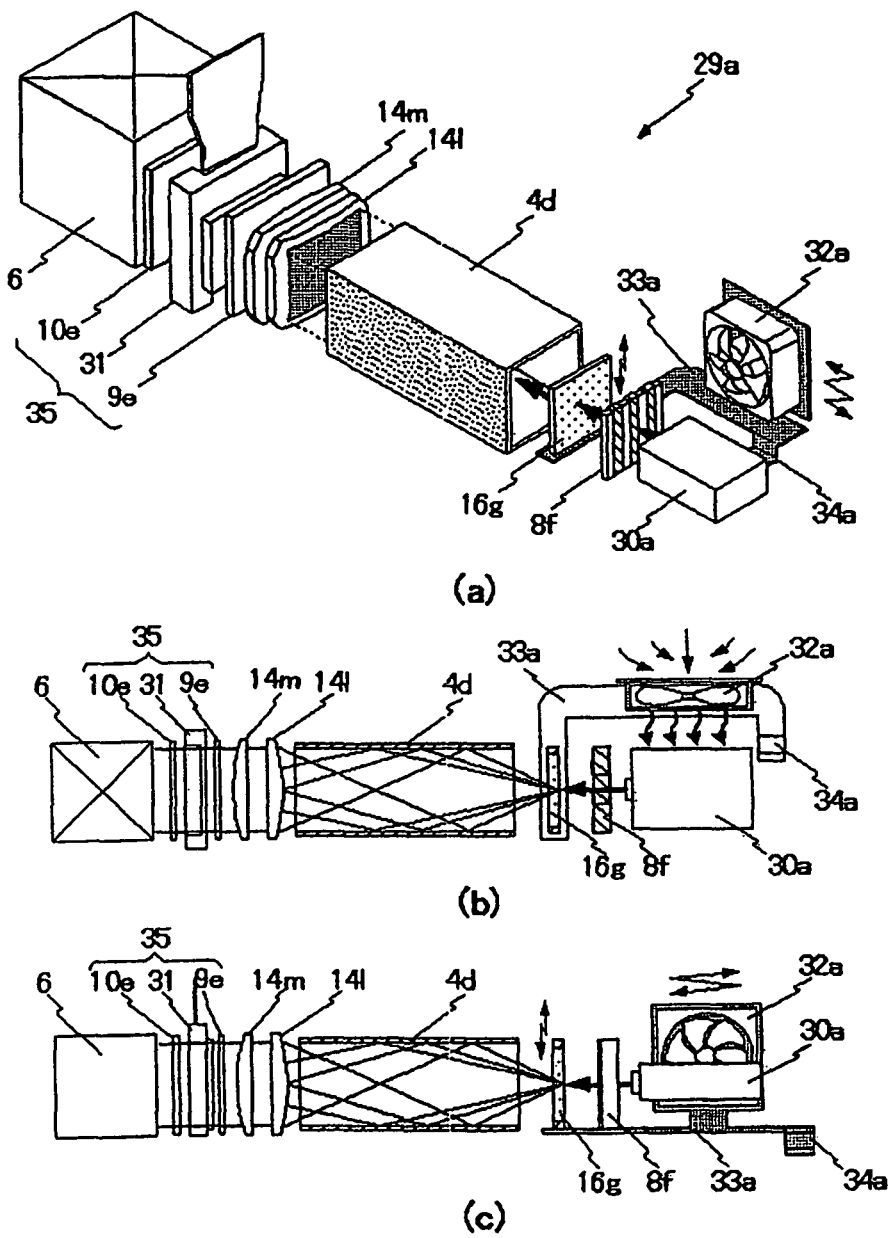
FIG. 6(a) is a schematic perspective view, (b) is a schematic plan view, and (c) is a schematic side view showing the first exemplary embodiment of the present invention.

FIG. 6 is a schematic view showing the first exemplary embodiment. More specifically, FIG. 6(a) is a schematic perspective view, FIG. 6(b) is a schematic plan view, and FIG. 6(c) is a schematic side view.

Projection-type image display apparatus 29a shown in FIG. 6 includes: semiconductor laser 30a that is the light source, diffuser 16g, light tunnel 4d, condenser lenses 14l and 14m, liquid crystal panel 31, and dichroic prism 6. Polarization beam splitter (PBS) 8f is arranged between diffuser 16g and semiconductor laser 30a. Incidence-side polarizing plate 9e is arranged on the light incidence side of liquid crystal panel 31. Emission-side polarizing plate 10e is arranged on the light emission side of liquid crystal panel 31.

Polarization beam splitter (PBS) 8f substantially decreases in transmittance when the angle of incidence of light diverges from the perpendicular direction, whereby polarization beam splitter (PBS) 8f is preferably arranged before the diffuser when the optics are made up from the combination of a diffuser and light tunnel. In other words, polarization beam splitter (PBS) 8f is preferably arranged between semiconductor laser 30a and diffuser 16g.

Air-cooling fan 32a for cooling semiconductor laser 30a is arranged close to semiconductor laser 30a. Air-cooling fan 32a is connected to diffuser 16g by means of a plate spring 33a. A portion (fixed part 34a) of plate spring 33a is secured to any point in the case (for example, the holding stage of the semiconductor laser).

Laser light that is emitted from semiconductor laser 30a is converted to a specific linearly polarized light by polarization beam splitter (PBS) 8f and irradiated into diffuser 16g. Laser light that has passed through diffuser 16g is irradiated into light tunnel 4d. The beam diameter of laser light that has passed through diffuser 16g is gradually enlarged until it is irradiated into light tunnel 4d. The laser light that is irradiated into light tunnel 4d, in the process of advancing while being repeatedly reflected inside light tunnel 4d, is shaped into luminous flux having a rectangular cross-section with uniform luminance distribution. The shaped laser light passes through condenser lenses 14l and 14m and is irradiated into optical modulation unit 35 that is made up from incidence-side polarizing plate 9e, liquid crystal panel 31 and emission-side polarizing plate 10e. The laser light that is irradiated into optical modulation unit 35 undergoes optical modulation according to image signals. The laser light that has undergone optical modulation is irradiated into dichroic prism 6 and synthesized with the colored light of other channels not shown in the figures. The synthesized laser light is then enlarged and projected onto a screen by way of a projection lens (not shown).

Air-cooling fan 32a both supplies cooling air current to semiconductor laser 30a and causes plate spring 33a and diffuser 16g to resonate at a solid propagation frequency.

For example, when the rotational speed of air-cooling fan 32a is set to 6500 rpm, the solid propagation frequency $f_D$ (Hz) of air-cooling fan 32a is $f_D$=6500/60=108.33 (Hz).

If the mass of diffuser 16g is m (kg) and the flexural rigidity K (N/m) of plate spring 33a is $K=m\times(2\lambda f_D)^2$, diffuser 16g vibrates at a response amplitude of plate spring 33a that corresponds to resonance frequency $f_D$.

In other words, the kinetic energy of the air-cooling fan that cools the semiconductor laser can be used to cause the diffuser to vibrate at the solid propagation frequency of the air-cooling fan. The amount of displacement of the diffuser resulting from the vibration matches the response amplitude at the resonance point of the plate spring. Essentially, the diffuser can be caused to vibrate at high frequency and large amplitude.

Accordingly, the speckle pattern is effectively integrated and the speckle noise is substantially reduced. Further, electric power is not consumed to cause the diffuser to vibrate and audible noise is not increased. In addition, because a simple configuration is employed that involves simply connecting the air-cooling fan and diffuser by a plate spring, a compact speckle-reducing construction can be realized at low cost. These effects are the basic effects that are shared by each of the following exemplary embodiments.

Figure 7:
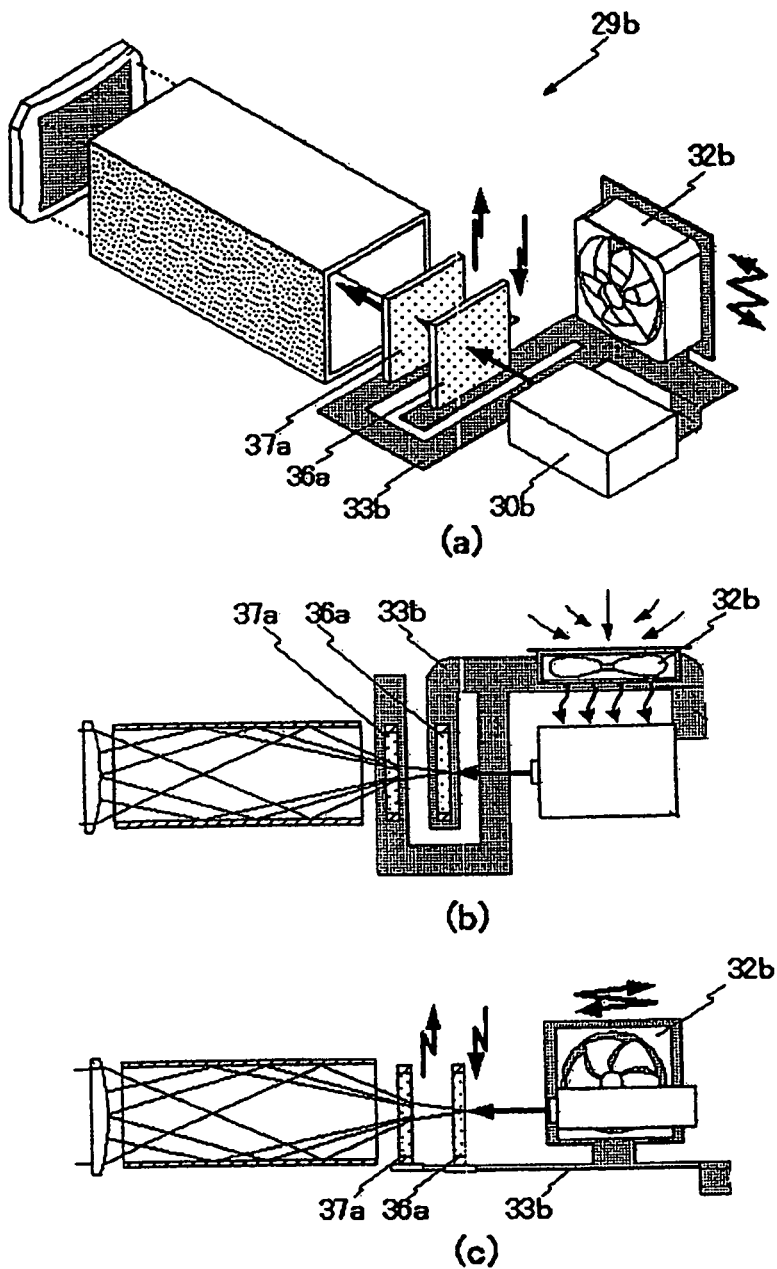
FIG. 7(a) is a schematic perspective view, (b) is a schematic plan view, and (c) is a schematic side view showing the second exemplary embodiment of the present invention.

The second exemplary embodiment of the projection-type image display apparatus of the present invention is next described. FIG. 7 is a schematic view showing the second exemplary embodiment. More specifically, FIG. 7(a) is a schematic perspective view, FIG. 7(b) is a schematic plan view, and FIG. 7(c) is a schematic side view.

In FIG. 7, the polarization beam splitter, the optical modulation unit (incidence-side polarizing plate, liquid crystal panel, emission-side polarizing plate), and the dichroic prism are omitted from the drawings to emphasize the differences with the first exemplary embodiment.

Projection-type image display apparatus 29b shown in FIG. 7 includes two diffusers (first diffuser 36a and second diffuser 37a). Diffuser 36a and diffuser 37a are connected to air-cooling fan 32b for cooling semiconductor laser 30b by means of plate spring 33b such that each of diffusers 36a and 37a can vibrate individually.

The rigidity of plate spring 33b is designed such that first diffuser 36a and second diffuser 37a vibrate at opposite phases to each other at the solid propagation frequency of air-cooling fan 32b. Plate spring 33b that receives the solid propagation vibration of air-cooling fan 32b during operation of air-cooling fan 32b therefore resonates, and first diffuser 36a and second diffuser 37a that are arranged in parallel vibrate in opposite directions. The relative speed and relative displacement (resonance amplitude) of the two diffusers are thus doubled. Accordingly, a sufficient speckle pattern integration effect is obtained even when using diffusers having a narrow angle of diffusion for suppressing optical loss.

Figure 8:
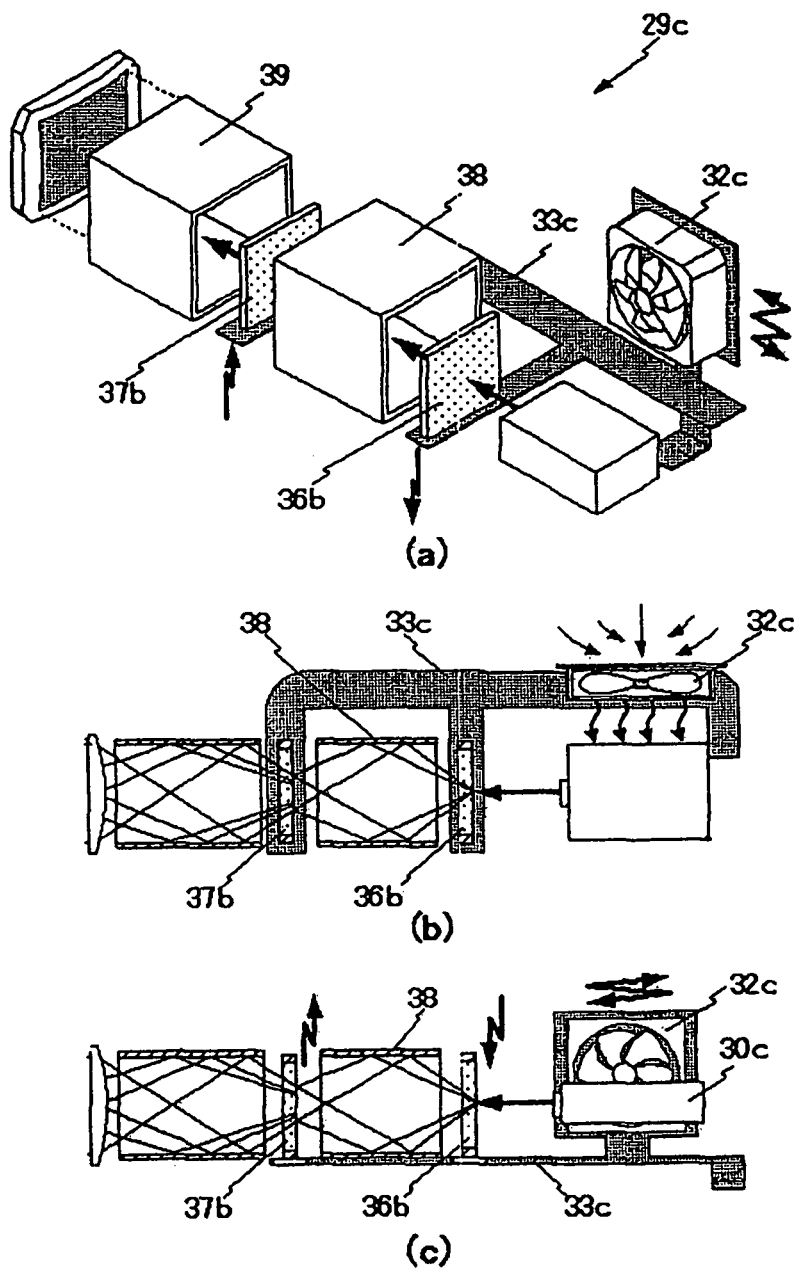
FIG. 8(a) is a schematic perspective view, (b) is a schematic plan view, and (c) is a schematic side view showing the third exemplary embodiment of the present invention.

The third exemplary embodiment of the projection-type image display apparatus of the present invention is next described. FIG. 8 is a schematic view showing the third exemplary embodiment. More specifically, FIG. 8(a) is a schematic perspective view, FIG. 8(b) is a schematic plan view, and FIG. 8(c) is a schematic side view.

In FIG. 8 as well, the polarization beam splitter, optical modulation unit (incidence-side polarizing plate, liquid crystal panel, and emission-side polarizing plate), and dichroic prism are omitted from the figure.

In projection-type image display apparatus 29c shown in FIG. 8, the optical integrator is divided into first light tunnel 38 and second light tunnel 39. In addition, projection-type image display apparatus 29c includes two diffusers (first diffuser 36b and second diffuser 37b). First diffuser 36b, first light tunnel 38, second diffuser 37b, and second light tunnel 39 are arranged on the optical axis in that order. First diffuser 36b and second diffuser 37b are connected to air-cooling fan 32c for cooling semiconductor laser 30c by plate spring 33c such that each of diffusers 36b and 37b can vibrate individually.

According to the construction of the present exemplary embodiment, the beam diameter of laser light that is incident to the optical modulation unit (not shown) is enlarged two times and the luminance distribution is equalized two times, whereby luminous flux having an extremely limited luminance irregularity and an ideal cross-section shape is obtained.

Plate spring 33c is designed to have a resonance mode such that first diffuser 36b and second diffuser 37b vibrate at mutually opposite phases at the solid propagation frequency of air-cooling fan 32c. Accordingly, as in the second exemplary embodiment, the relative speed and relative displacement of first diffuser 36b and second diffuser 37b are doubled and a sufficient speckle pattern integration effect is obtained.

The vibration mode of a diffuser in the second exemplary embodiment and third exemplary embodiment is next described based on the results of eigenvalue analysis by means of simulation.

Figure 9:
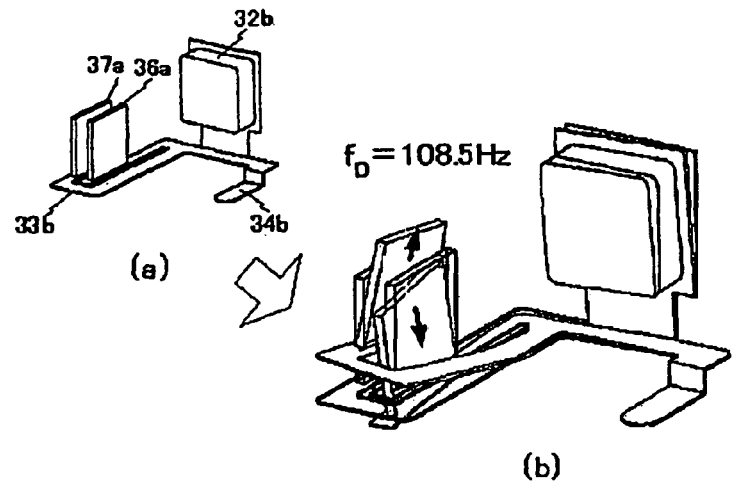
FIG. 9(a) is a perspective view of an analysis model of a diffuser in the second exemplary embodiment, and (b) is a perspective view showing the mode shape of the diffuser.

FIG. 9(a) is a perspective view of an analysis model of diffusers 36a and 37a in the second exemplary embodiment. FIG. 9(b) shows the mode shapes of diffusers 36a and 37a at the solid propagation frequency of air-cooling fan 32b.

The analysis model shown in FIG. 9(a) was modeled by picking out only the drive unit of diffusers 36a and 37a in the second exemplary embodiment. First diffuser 36a and second diffuser 37a are connected to air-cooling fan 32b by way of plate spring 33b. Calculation is carried out on the assumption that fixed part 34b of plate spring 33b is completely secured. The mass of each of first diffuser 36a and second diffuser 37a is 1 g, and plate spring 33b is fabricated from stainless steel 0.5 mm thick.

In the above-described simulation by means of an analysis model, a vibration mode is obtained in which, as shown in FIG. 9(b), first diffuser 36a and second diffuser 37a vibrate at mutually opposite phases in a vertical direction (a direction orthogonal to the optical axis) at 108.5 kHz that matches the solid propagation frequency of air-cooling fan 32b.

Figure 10:
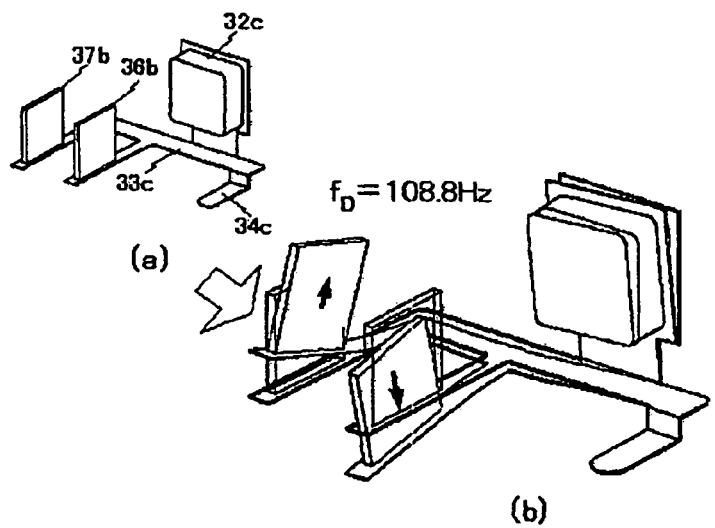
FIG. 10(a) is a perspective view of an analysis model of a diffuser in the third exemplary embodiment, and (b) is a perspective view showing the mode shape of the diffuser.

FIG. 10(a) is a perspective view of the analysis model of diffusers 36b and 37b in the third exemplary embodiment.

FIG. 10(b) shows the mode shape of diffusers 36b and 37b at the solid propagation frequency of air-cooling fan 32c.

The analysis model shown in FIG. 10(a) was modeled by picking out only the drive unit of diffusers 36b and 37b in the third exemplary embodiment. First diffuser 36b and second diffuser 37b are connected to air-cooling fan 32c by way of plate spring 33c. Calculation is carried out on the assumption that fixed part 34c of plate spring 33c is completely secured. The mass of each of first diffuser 36b and second diffuser 37b is 1 g, and plate spring 33c is fabricated of stainless steel that is 0.5 mm thick.

In the simulation of the above-described analysis model, a vibration mode is obtained in which, as shown in FIG. 10(b), first diffuser 36b and second diffuser 37b vibrate at mutually opposite phases in a vertical direction (a direction orthogonal to the optical axis) at 108.8 kHz that matches the solid propagation frequency of air-cooling fan 32c.

By causing two diffusers to vibrate at opposite phases in this way, the speckle pattern of laser light that passes through the two diffusers is effectively averaged, and speckle noise is substantially reduced.

The shape of the plate spring shown in the figure is only an example. The shape of the plate spring is not limited to any particular shape as long as the shape obtains a desired vibration mode at a predetermined frequency (the solid propagation frequency of the fan).

Figure 11:
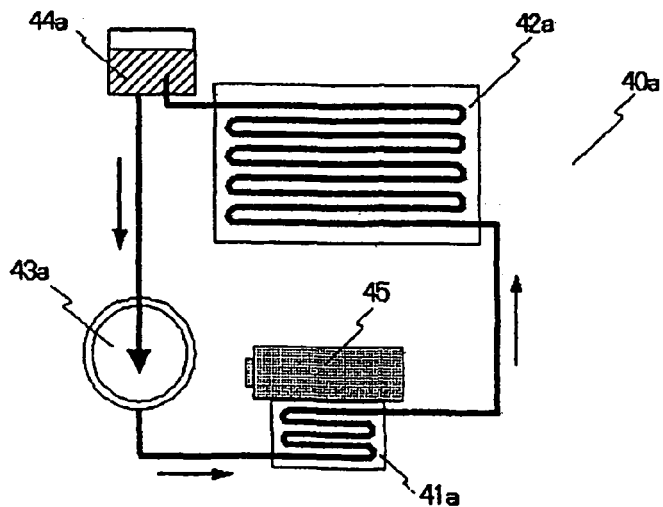
FIG. 11 is a block diagram showing the configuration of a water cooling system.

The fourth exemplary embodiment of the projection-type image display apparatus of the present invention is next described. FIG. 11 is a block diagram of a water cooling system used in the present exemplary embodiment.

Water cooling system 40a shown in FIG. 11 includes heating jacket 41a, radiator 42a, circulation pump 43a, and reserve tank 44a. Heating jacket 41a is thermally connected to heating element 45 and absorbs the heat produced by heating element 45. The heat absorbed by heating jacket 41a is conveyed to radiator 42a by way of a coolant liquid that flows inside heating jacket 41a. In radiator 42a, the coolant liquid is cooled by the thermal exchange (radiation) between the coolant liquid and the outside air. Natural air cooling or forced air cooling is used in cooling of the coolant liquid in radiator 42a. The cooled coolant liquid is conveyed to heating jacket 41a by way of reserve tank 44a by circulation pump 43a. Reserve tank 44a compensates for loss of coolant liquid due to volatilization and thus maintains the amount of coolant liquid in the system.

The above-described water cooling system features quiet operation and higher cooling performance than an air cooling system and is therefore suited to quiet cooling of a heating element that gives off a large volume of heat. The above-described water cooling system can therefore be adopted as the cooling means of a semiconductor laser when a high-output semiconductor laser is used in a high-luminance projector.

Figure 12:
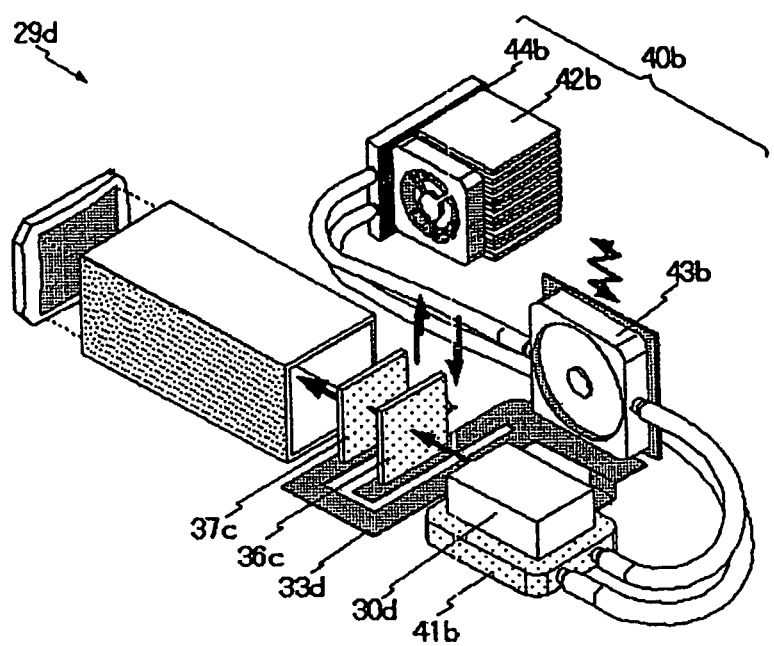
FIG. 12 is a schematic perspective view showing the fourth exemplary embodiment of the present invention.

FIG. 12 is a schematic perspective view of the projection-type image display apparatus of the fourth exemplary embodiment. In FIG. 12 as well, polarization beam splitter, optical modulation unit (incidence-side polarizing plate, liquid crystal panel, emission-side polarizing plate), and dichroic prism are omitted from the figure.

In projection-type image display apparatus 29d shown in FIG. 12, first diffuser 36c and second diffuser 37c are connected to circulation pump 43b of water cooling system 40b by way of plate spring 33d. Plate spring 33d is designed such that first diffuser 36c and second diffuser 37c vibrate at mutually opposite phases at the solid propagation frequency of circulation pump 43b. Thus, when water cooling system 40b is applied to the cooling of semiconductor laser 30d, the same effect as the above-described second exemplary embodiment is obtained.

Circulation pump 43b in FIG. 12 corresponds to circulation pump 43a in FIG. 11. Heating jacket 41b similarly corresponds to heating jacket 41a. Radiator 42b corresponds to radiator 42a. Reserve tank 44b corresponds to reserve tank 44a. Semiconductor laser 30b corresponds to heating element 45.

In FIG. 12, an example is shown in which the air cooling system of the second exemplary embodiment is replaced by a water cooling system, but the air cooling system of the first exemplary embodiment or the third exemplary embodiment can also be replaced by a water cooling system.

A low-output semiconductor laser may be used as a light source in a low-luminance projector. In such cases, a cooling means (air cooling fan) dedicated to the semiconductor laser may not be provided.

In the case described hereinabove, the diffusers installed in each of channels R/G/B are connected as a group to an exhaust fan by way of a plate spring. The exhaust fan is a fan for discharging air inside the case to the outside in order to discharge heat. In this construction, each of the diffusers resonates at the solid propagation frequency of the exhaust fan. However, the distance between the exhaust fan and the diffuser of each channel differs. With respect to the plate spring, each of the following differ in length: a first part that connects the exhaust fan and the R-channel diffuser, a second part that connects the exhaust fan and the G-channel diffuser, and a third part that connects the exhaust fan and the B-channel diffuser. As a result, the plate spring must be designed such that the first to third parts have a common resonance frequency.

Alternatively, only the G-channel diffuser that has the most influence upon speckle contrast (to be described) of white light is connected to the exhaust fan and caused to vibrate. In the case of a low-luminance projector, a certain visual effect is obtained even when only the speckle noise of green laser light is eliminated.

Finally, the speckle reduction effect realized by the present invention is next described based on the results of actual measurement. Generally, speckle contrast is known as an index for quantitative evaluation of the intensity of speckle noise. Speckle contrast ($\eta$) is expressed by the ratio of the standard deviation ($\sigma_1$) of speckle pattern intensity and average intensity ($I_{AVE}$) of the speckle pattern, as shown in the following equation:

$$\eta = \sigma_1 / I_{AVE}$$

Accordingly, when N is the number of data items (number of speckle image pixels) and I(n) is the luminance of the $n^{th}$ data item (pixel), the standard deviation ($\sigma_1$) of speckle pattern and the average intensity ($I_{AVE}$) are as shown by the following equation:

{Equation 1}

A speckle image (first speckle image) of the state in which the air cooling fan is stopped in the second exemplary embodiment and a speckle image (second speckle image) of the state in which the air-cooling fan is in operation are photographed and a luminance histogram of each of the speckle images is found. A speckle image is an image (surface light source image) shown on a screen that is arranged in front of the emission port of the light tunnel shown in FIG. 7.

A mottled speckle pattern was revealed in the first speckle image. As a result, the standard deviation ($\sigma_1$) of the luminance histogram increased in size and speckle contrast (η) also exhibited a large value (η=11.8%).

On the other hand, in the second speckle image, the speckle pattern was considerably reduced compared to the first speckle image. As a result, the standard deviation ($\sigma_1$) of the luminance histogram was smaller and speckle contrast (η) also exhibited a small value (η=4.9%). In other words, speckle contrast was reduced more than 58%.

Thus, according to the present invention, a speckle reduction construction that obtains a sufficient speckle reduction effect is realized at low cost. The speckle reduction construction according to the present invention further features smaller size, lower noise, and lower power consumption.

The invention claimed is:

1. A projection image display apparatus that enlarges and displays an image, said projection image display apparatus comprising:
   a case;
   a laser light source;
   a cooling mechanism that includes a component that produces vibration during an operation;
   a diffuser that diffuses light emitted from said laser light source;
   optics that shape the light that is diffused by said diffuser to light having a uniform luminance distribution and a rectangular cross-section; and
   an optical modulation element that modulates the light shaped by said optics,
   wherein said component included in said cooling mechanism and said diffuser are connected by a vibration transmitting member,
   wherein said component causes a sympathetic vibration between said vibration transmitting member and said diffuser, and
   wherein an end portion of said vibration transmitting member is secured to a part that is disposed on the case and said diffuser is disposed above another end portion of said vibration transmitting member, wherein said cooling mechanism is disposed on said vibration transmitting member between said part and said diffuser.

2. A projection image display apparatus that enlarges and displays an image, said projection image display apparatus comprising:
   a case;
   a laser light source;
   a cooling mechanism that includes a component that produces vibration during an operation;
   a diffuser that diffuses light emitted from said laser light source;
   optics that shape the light that is diffused by said diffuser to light having a uniform luminance distribution and a rectangular cross-section; and
   an optical modulation element that modulates the light shaped by said optics,
   wherein said component included in said cooling mechanism and said diffuser are connected by a vibration transmitting member, and
   wherein a solid propagation frequency of said component included in said cooling mechanism matches a characteristic frequency of said vibration transmitting member.

3. The projection image display apparatus as set forth in claim wherein said diffuser comprises a plurality of diffusers, and
   wherein each of the diffusers is connected to said component included in said cooling mechanism by said vibration transmitting member.

4. The projection image display apparatus as set forth in claim 3, wherein a solid propagation frequency of said component included in said cooling mechanism matches the characteristic frequency of said vibration transmitting member.

5. The projection image display apparatus as set forth in claim 3, wherein said optics include a plurality of optical elements, and the plurality of optical elements and said plurality of diffusers are arranged alternately.

6. The projection image display apparatus as set forth in claim 3, wherein a vibration mode of said vibration transmitting member at a solid propagation frequency of said component included in said cooling mechanism has a mode shape that causes said plurality of diffusers to vibrate at mutually opposite phases.

7. The projection image display apparatus as set forth in claim 1, wherein said vibration transmitting member comprises a plate spring.

8. The projection image display apparatus as set forth in claim 1, wherein said component included in said cooling mechanism comprises a fan that supplies cooling air to said laser light source.

9. The projection image display apparatus as set forth in claim 1, wherein said component included in said cooling mechanism comprises a fan that discharges air from an inside of said case to an outside of said case.

10. The projection image display apparatus as set forth in claim 1, wherein said component included in said cooling mechanism comprises a pump for circulating a coolant liquid.

11. A projection image display apparatus that enlarges and displays an image, said projection image display apparatus comprising:
    a case;
    a light source;
    an air cooling fan that produces vibration during an operation;
    a component that is connected to said air cooling fan by a vibration transmitting member; and
    an optical modulation element that modulates light from said light source,
    wherein said air cooling fan causes a sympathetic vibration between said vibration transmitting member and said component, and
    wherein an end portion of said vibration transmitting member is secured to a part that is disposed on the case and said component is disposed above another end portion of said vibration transmitting member, wherein said air cooling fan is disposed on said vibration transmitting member between said part and said component.

12. The projection image display apparatus as set forth in claim 11, wherein said component comprises a diffuser.

13. A method for vibrating a diffuser of a projection image display apparatus that comprises a case, a laser light source, a cooling mechanism that includes a component that produces vibration during an operation, a diffuser that diffuses light emitted from said laser light source, optics that shape the light that is diffused by said diffuser to light having a uniform luminance distribution and a rectangular cross-section, and an optical modulation element that modulates the light shaped by said optics, said method comprising:
    creating, by said component, a sympathetic vibration between a vibration transmitting member and said diffuser,
    wherein said vibration transmitting member connects said component included in said cooling mechanism and said diffuser, and
    wherein an end portion of said vibration transmitting member is secured to a part that is disposed on the case and said diffuser is disposed above another end portion of said vibration transmitting member, wherein said cooling mechanism is disposed on said vibration transmitting member between said part and said diffuser.

14. A method for vibrating a component of a projection image display apparatus that comprises a case, a light source, an air cooling fan that produces vibration during an operation, a component that is connected to said air cooling fan by a vibration transmitting member, and an optical modulation element that modulates light from said light source, said method comprising:

creating, by said air cooling fan, a sympathetic vibration between said vibration transmitting member and said component, and wherein an end portion of said vibration transmitting member is secured to a part that is disposed on the case and said component is disposed above another end portion of said vibration transmitting member, wherein said air cooling fan is disposed on said vibration transmitting member between said part and said component.

15. The projection image display apparatus as set forth in claim 1, wherein said component causes said vibration transmitting member and said diffuser to resonate at a solid propagation frequency.

16. The projection image display apparatus as set forth in claim 1, wherein a solid propagation frequency of said component matches a characteristic frequency of said vibration transmitting member.

17. The projection image display apparatus as set forth in claim 1, wherein said diffuser comprises a plurality of diffusers, and wherein a vibration mode of said vibration transmitting member at a solid propagation frequency of said component has a mode shape that causes said plurality of diffusers to vibrate at mutually opposite phases.

18. The projection image display apparatus as set forth in claim 2, wherein said characteristic frequency of said vibration transmitting member comprises a response amplitude of said vibration transmitting member at a resonance point.

19. The projection image display apparatus as set forth in claim 2, wherein said component causes a sympathetic vibration between said vibration transmitting member and said diffuser.

20. The projection image display apparatus as set forth in claim 2, wherein said diffuser comprises a plurality of diffusers, and wherein a vibration mode of said vibration transmitting member at the solid propagation frequency of said component has a mode shape that causes said plurality of diffusers to vibrate at mutually opposite phases.

* * * * *